US009645344B2

(12) United States Patent
Herrington et al.

(10) Patent No.: US 9,645,344 B2
(45) Date of Patent: May 9, 2017

(54) INVERTED CABLE STORAGE DEVICE

(71) Applicant: Hubbell Incorporated, Shelton, CT (US)

(72) Inventors: Emily Hope Herrington, Birmingham, AL (US); Joshua Charles Wilson, Moody, AL (US); John E. Sakmar, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/019,547

(22) Filed: Feb. 9, 2016

(65) Prior Publication Data

US 2017/0045705 A1    Feb. 16, 2017

Related U.S. Application Data

(60) Provisional application No. 62/203,706, filed on Aug. 11, 2015.

(51) Int. Cl.
  *G02B 6/00*  (2006.01)
  *G02B 6/44*  (2006.01)
  *G02B 6/48*  (2006.01)

(52) U.S. Cl.
  CPC .......... *G02B 6/4478* (2013.01); *G02B 6/483* (2013.01)

(58) Field of Classification Search
  CPC ............................ G02B 6/4478; G02B 6/3887
  USPC ................................... 385/134–136
  See application file for complete search history.

(56) References Cited

U.S. PATENT DOCUMENTS

| 2,935,550 | A |   | 5/1960  | Gunther |
|-----------|---|---|---------|---------|
| 5,092,663 | A |   | 3/1992  | Hivner |
| 5,097,529 | A |   | 3/1992  | Cobb et al. |
| 5,109,467 | A |   | 4/1992  | Hogan et al. |
| 5,243,679 | A |   | 9/1993  | Sharrow |
| 5,285,515 | A | * | 2/1994  | Milanowski ......... G02B 6/4453 385/135 |
| 5,375,185 | A |   | 12/1994 | Hermsen |
| 5,408,571 | A |   | 4/1995  | Kaplan |
| 5,689,605 | A |   | 11/1997 | Cobb |
| 5,724,469 | A |   | 3/1998  | Orlando |
| 5,867,624 | A | * | 2/1999  | Forrester ................ G02B 6/483 385/100 |
| 5,966,492 | A | * | 10/1999 | Bechamps ........... G02B 6/4471 385/135 |
| 6,208,797 | B1| * | 3/2001  | Vanderhoof ......... G02B 6/4453 385/134 |
| 6,215,937 | B1|   | 4/2001  | Dinh |
| 6,263,144 | B1| * | 7/2001  | Daoud ................ G02B 6/4459 385/134 |

(Continued)

OTHER PUBLICATIONS

PCT/US2015/045455 International Search Report and Written Opinion dated Nov. 24, 2015.

*Primary Examiner* — Ellen Kim
(74) *Attorney, Agent, or Firm* — Michael Best & Friedrich, LLP

(57) ABSTRACT

A cable supporting device includes a channel member having a top flange, a bottom flange, and an outer wall defining an inward facing channel. The channel extends around a curved back section, a first side section, and a second side section. A cross brace extends from the first side section to the second side section. The cable supporting device is used in a distribution system to store excess cable.

20 Claims, 9 Drawing Sheets

(56) References Cited

U.S. PATENT DOCUMENTS

| | | | |
|---|---|---|---|
| 6,311,006 B1 * | 10/2001 | Forrester | G02B 6/483 174/70 R |
| 6,512,875 B1 * | 1/2003 | Johnson | H02G 3/0608 248/228.4 |
| 6,885,805 B2 * | 4/2005 | Asada | H02G 3/0487 385/134 |
| 6,898,363 B2 | 5/2005 | Forrester et al. | |
| 6,930,244 B1 | 8/2005 | Nebel | |
| 7,085,468 B2 | 8/2006 | Forrester | |
| 7,116,883 B2 | 10/2006 | Kline | |
| 7,236,681 B2 | 6/2007 | Moheb et al. | |
| 7,315,680 B1 * | 1/2008 | Rapp | G02B 6/4459 248/68.1 |
| 7,340,144 B2 | 3/2008 | Dobbins et al. | |
| 7,346,253 B2 * | 3/2008 | Bloodworth | G02B 6/4453 385/134 |
| 7,356,237 B2 | 4/2008 | Mullaney et al. | |
| 7,418,184 B1 | 8/2008 | Gonzales et al. | |
| 7,477,829 B2 | 1/2009 | Kaplan | |
| 7,580,607 B2 * | 8/2009 | Jones | G02B 6/483 385/134 |
| 7,822,310 B2 | 10/2010 | Castonguay et al. | |
| 8,280,215 B2 | 10/2012 | Hetzer | |
| 8,374,477 B2 | 2/2013 | Hill | |
| 8,385,711 B2 | 2/2013 | Fabrykowski | |
| 8,660,397 B2 | 2/2014 | Giraud | |
| 2004/0108426 A1 | 6/2004 | Turvey | |
| 2005/0145522 A1 | 7/2005 | Bloodworth et al. | |
| 2005/0238311 A1 | 10/2005 | Forrester | |
| 2006/0098930 A1 | 5/2006 | Forrester | |
| 2006/0275010 A1 | 12/2006 | Forrester | |
| 2007/0036506 A1 | 2/2007 | Kewitsch | |
| 2008/0199139 A1 | 8/2008 | Henderson | |
| 2008/0205844 A1 | 8/2008 | Castonguay | |
| 2008/0230643 A1 | 9/2008 | Ornskar | |
| 2010/0054680 A1 | 3/2010 | Lochkovic et al. | |
| 2014/0197261 A1 | 7/2014 | Witherbee | |
| 2015/0131957 A1 | 5/2015 | Gilbreath et al. | |

* cited by examiner

SECTION A-A

DETAIL B

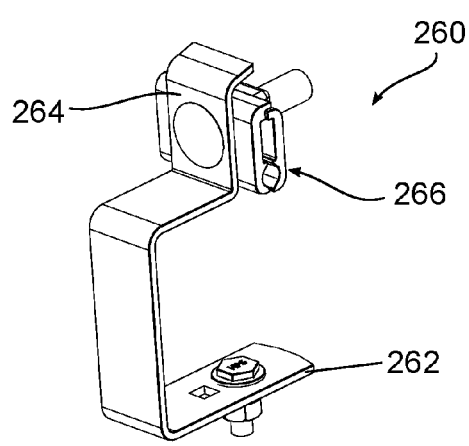
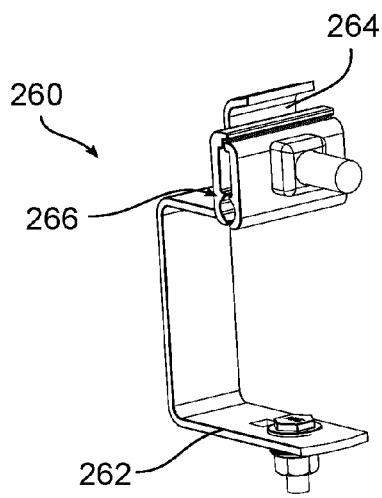
FIG. 15
FIG. 16
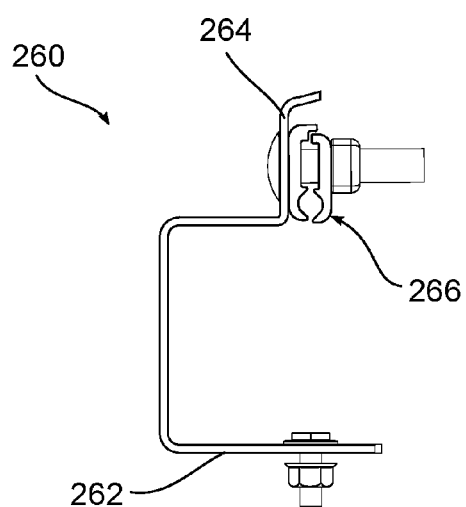
FIG. 17

INVERTED CABLE STORAGE DEVICE

RELATED APPLICATION(S)

This application is based on U.S. Provisional Application Ser. No. 62/203,706, filed Aug. 11, 2015, the disclosure of which is incorporated herein by reference in its entirety and to which priority is claimed.

FIELD

Various exemplary embodiments relate to storing cable, for example fiber optic cable and fiber optic drop wire along an aerial transmission route or to be left at a fiber drop terminal.

BACKGROUND

Modern telecommunication systems utilize a number of materials and mediums to transmit information. Recently, cables, such as fiber optic cables, have become more popular in the communication industry and have begun to replace electrical wires. Fiber optic cables include transparent optical fibers made of glass or plastic and are capable of transmitting voice, video, and data. Compared to electrical wires, fiber optic cables permit signals to travel longer distances with less loss and less electromagnetic interference.

Fiber optic cable is typically installed on aerial transmission routes in long lengths so as to minimize the number of splices, each of which degrades optical signals and is expensive. Because of certain problems related with splicing, such as expense, it is generally more desirable to overbuild for the amount of cable and store the cable for future builds or repairs. To allow for rerouting during movement or repairs, slack is provided in the form of surplus lengths of cable at intervals along the route. With increased storage intervals, it is less probable that lengths of cable must be rehung if rerouting is necessary. Storing surplus cable can pose a problem if not done correctly, as optical cable has a minimum bend radius and is vulnerable to damage from bending and twisting that can result in fiber breakage or an increase in signal loss.

SUMMARY

According to an exemplary embodiment, a cable supporting device includes a channel member having a top flange, a bottom flange, and an outer wall defining an inward facing channel. The channel extends around a curved back section, a first side section, and a second side section. A cross brace extends from the first side section to the second side section.

According to another exemplary embodiment, a cable distribution system includes a plurality of poles and a cable extending along the plurality of poles. A cable supporting device includes a channel member having a top flange, a bottom flange, and an outer wall defining a channel. The channel extends around a curved back section, a first side section, and a second side section defining an interior and a cross brace extends across the interior. The channel has an opening facing the interior. A surplus portion of the cable is positioned in the channel of the cable supporting device.

Other exemplary embodiments are directed to a method of supporting cable. A cable supporting device is attached to a distribution system. The cable supporting device includes a channel member having a top flange, a bottom flange, and an outer wall defining a channel extending around a curved back section, a first side section, and a second side section defining an interior of the cable support. A cross brace extends across the interior and the channel has an opening facing the interior. A loop of a cable is formed and at least a portion of the loop is positioned in the channel.

BRIEF DESCRIPTION OF DRAWINGS

The aspects and features of various exemplary embodiments will be more apparent from the description of those exemplary embodiments taken with reference to the accompanying drawings, in which:

FIG. 15 is a left perspective view of an exemplary mounting bracket;

FIG. 16 is a right perspective view of the mounting bracket of FIG. 15;

FIG. 17 is a front view of the mounting bracket of FIG. 15;

DETAILED DESCRIPTION OF EXEMPLARY EMBODIMENTS

Figure 1:
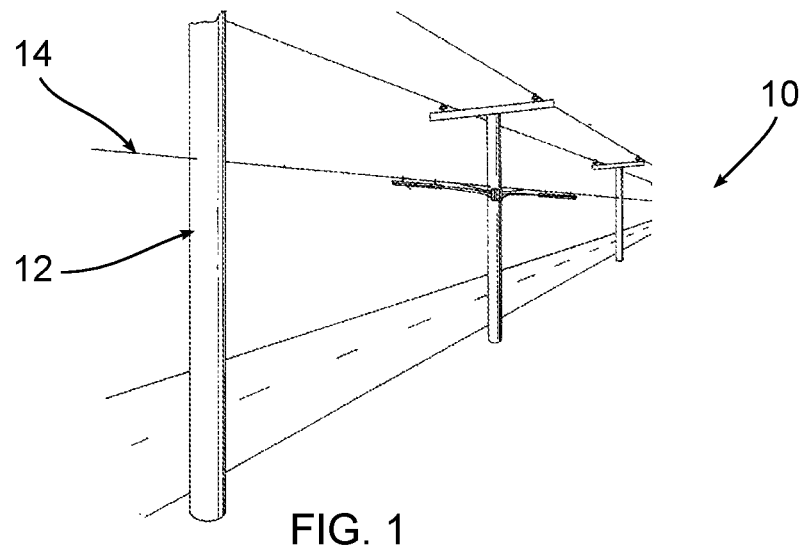
FIG. 1 is a perspective view of a transmission line according to an exemplary embodiment.
Figure 2:
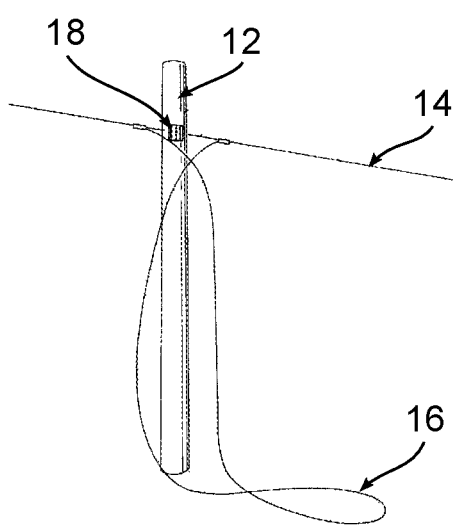
FIG. 2 is a perspective view of a transmission line and cable loop according to an exemplary embodiment.

FIG. 1 depicts an illustrative embodiment of an overhead transmission line 10 including a series of poles 12 inserted into the ground supporting standard power transmission lines and an aerial transmission or support line 14. A communication line, for example a fiber optic cable, can be connected to the support line 14. The poles 12 utilize different clamps and connectors for the power and fiber optic cable lines 14. One or more poles 12 include a surplus length or loop 16 of cable as depicted in FIG. 2. A cable guide 18 having one or more slots is attached to the pole 12 to assist in guiding and supporting the cable loop 16.

Figure 3:
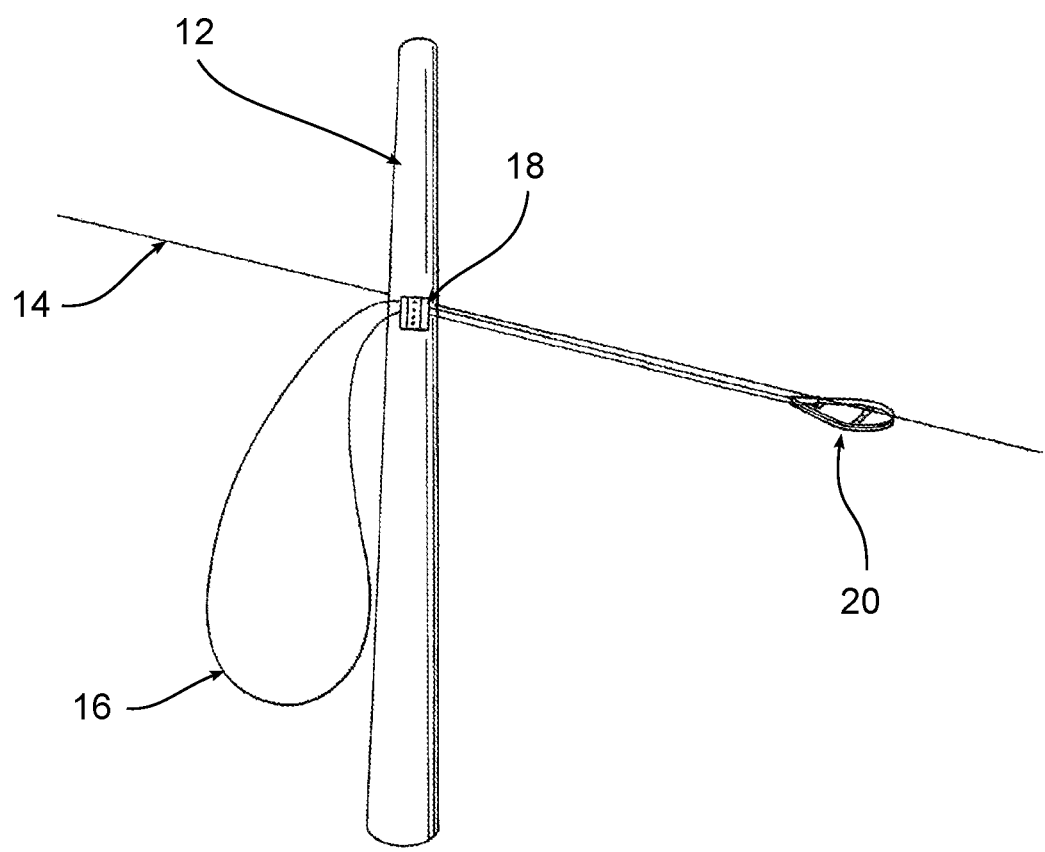
FIG. 3 is a perspective view of transmission line and cable loop with a cable support according to an exemplary embodiment.
Figure 4:
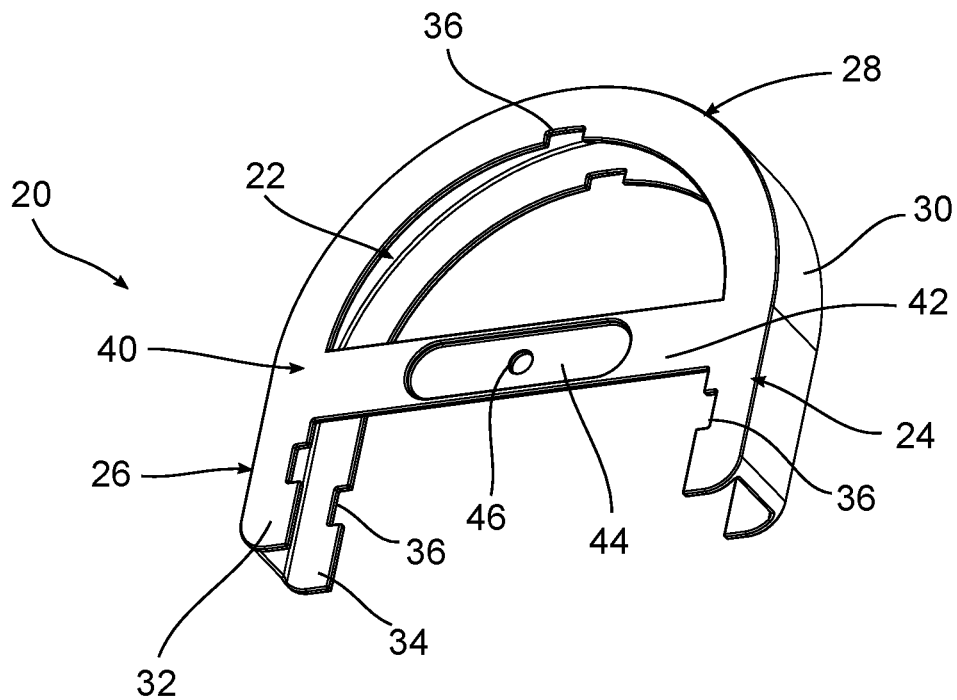
FIG. 4 is a top perspective view of an exemplary cable support.
Figure 5:
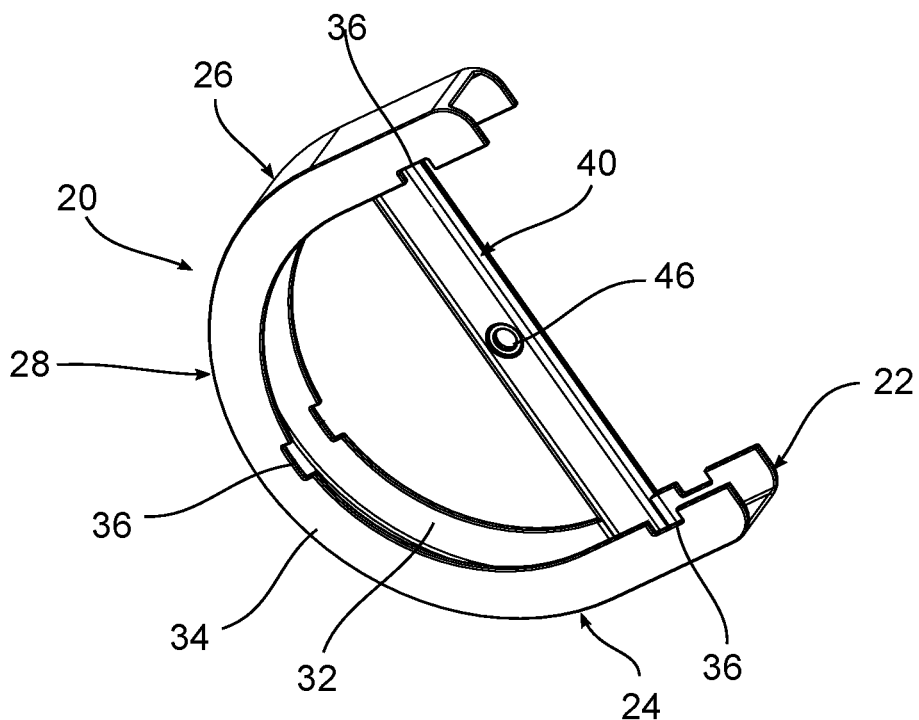
FIG. 5 is a bottom perspective view of the cable support of FIG. 4.
Figure 6:
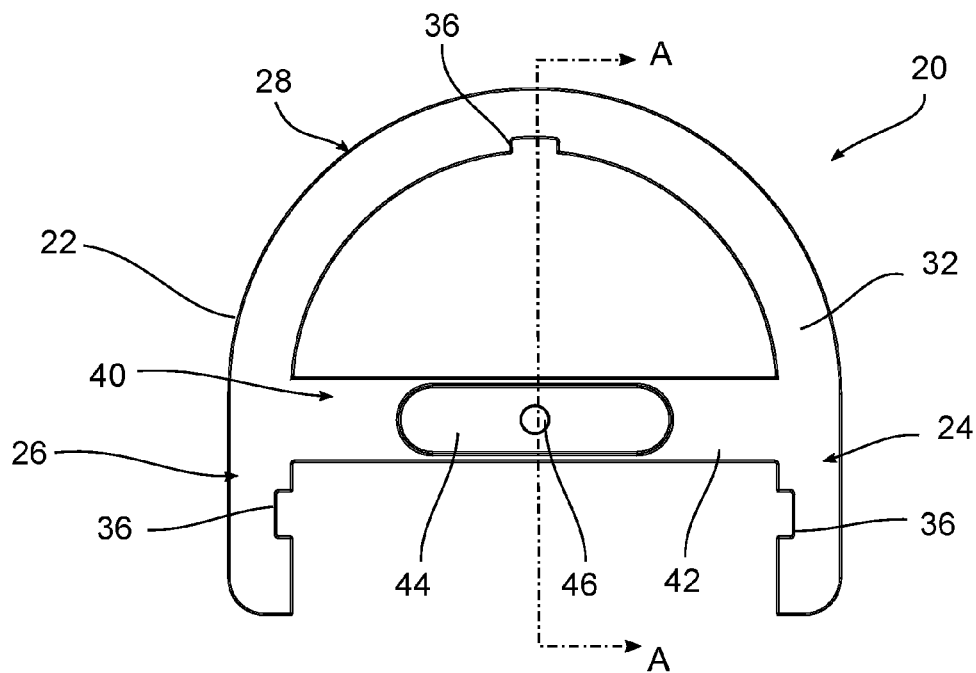
FIG. 6 is a top view of the cable support of FIG. 4.
Figure 7:
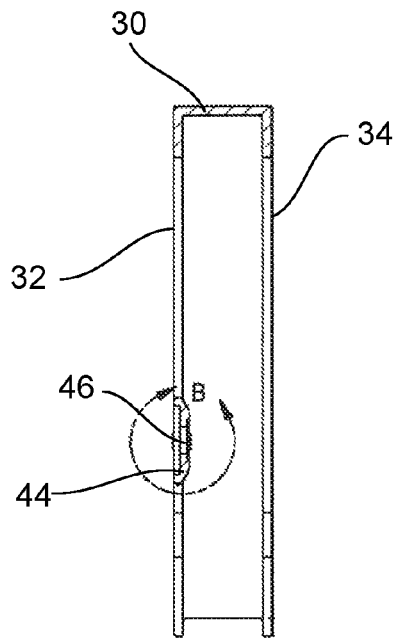
FIG. 7 is a sectional view of FIG. 6 taken along line A-A.

Storage of surplus cable should include measures to prevent the cable from exceeding the manufacture's minimum bending limits under variable conditions. According to an exemplary embodiment, one or more cable supports 20 attach to the line 14 to support the ends of the loop 16 and prevent the ends from bending beyond the minimum limit. According to the illustrative embodiment shown in FIG. 3, two portions of the loop 16 are inserted into the cable guide 18 to separate the loop 16 into a first section and a second section. A first cable support 20 receives the first section of the loop 16 and is positioned on the line 14 so that the cable is taut or otherwise stretched to a required distance. A second cable support (not shown) receives the second section of the loop 16 and is positioned on the line 14 on the opposite side of the pole 12 so that the cable is taut or otherwise stretched to a required distance. The cable supports 20 may be attached to the line 14 by various mounting hardware, such as sleeves, clamps, and fasteners. The portions of the cable between the cable support 20 and the cable guide 18 can be secured to the line 14 using bands or tie wraps as needed. In other exemplary embodiments, cable supports 20 can be connected to the poles to store excess cable.

FIGS. 4-8 depict an exemplary embodiment of a cable support 20. The cable support 20 includes channel member 22 having a curved portion that retains a section of the cable approximately at or above a minimum bend radius associated with the cable. In the exemplary embodiment, the cable support 20 has a substantially horseshoe-shaped channel member 22 extending from a first open end to a second open end having a first side section 24, a second side section 26, and a curved back section 28. The channel member 22 includes an outer wall 30, a top flange 32, and a bottom flange 34. The top and bottom flanges 32, 34 extend from the outer wall 30 towards the interior of the cable support 20 to create an inward facing channel.

The inward facing channel provides at least one advantage over a cable support having an outward or upward facing channel. For example, cables stored in the cable support will have a tendency to bow outward or upward, potentially displacing the cables from the channel and the support, and an inwardly facing channel resists this movement and helps to retain the cables.

According to an exemplary embodiment, the channel member 22 has one or more slots 36 positioned in the top and bottom flanges 32, 34. The exemplary embodiment includes three slots 36 with one positioned in the first side section 24, one positioned in the second side section 26, and one positioned on the back section 28. The slots 36 can be used to retain bands or tie wraps wrapped around the channel member 22 as needed.

Figure 8:
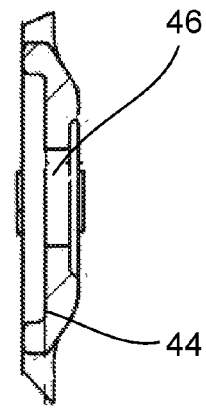
FIG. 8 is an enlarged view of area B of FIG. 7.

According to a further exemplary embodiment, a cross brace 40 extends from the first side section 24 to the second side section 26 across an interior region of the cable support 20. The cross brace 40 includes a top surface 42, a depression 44, and an opening 46, although other shapes and configurations may be used. The depression 44 is spaced below the top surface 42. The opening 46 and the depression 44 are configured to receive mounting components, for example mounting brackets and/or fasteners, to connect the cable support 20 to the line 14. As best shown in FIG. 8, a counter-sink can be formed around the opening to receive a portion of a fastener, for example a nut or bolt head.

In various alternative embodiments, the size, shape, and configuration of the cable support 20 varies. For example, the cable support 20 may have a closed configuration with a curved front and back. Other alternative embodiments can omit the cross brace 40 or utilize additional cross braces. The position of the cross brace 40 may also be varied from what is shown in the exemplary embodiment of FIGS. 4-8.

The cable support 20 can be made from a plastic, metal, ceramic, or composite material, or any combination thereof.

In various exemplary embodiments, the cable support 20 is made from aluminum, an injection molded plastic, or any other stiff, lightweight material. The cable support 20 can be a unitary structure or it can be formed from separate connected pieces. For example, the cross brace 40 may be formed separately and welded to the channel member 22.

Figure 9:
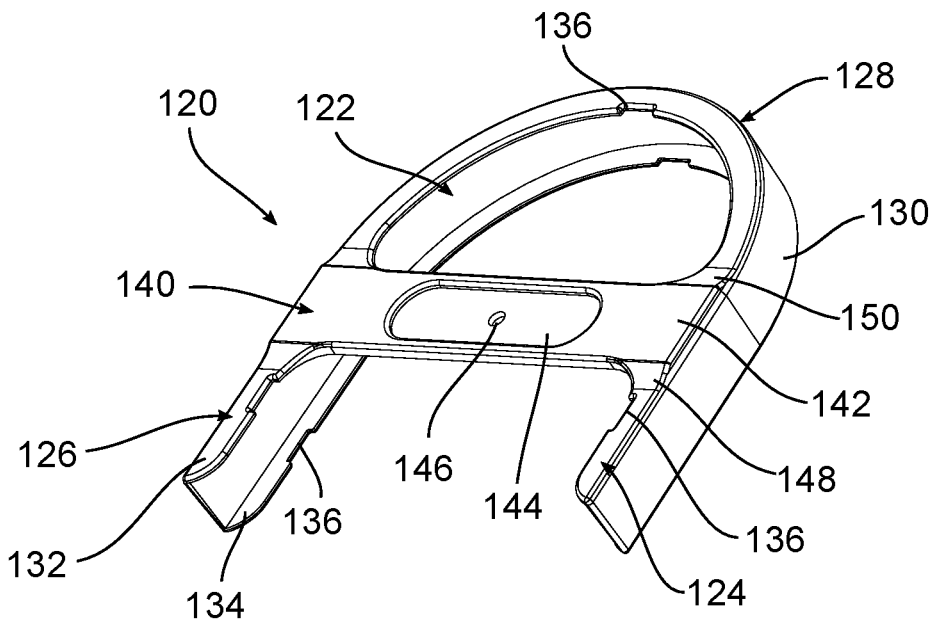
FIG. 9 is a top perspective view of another exemplary cable support.
Figure 10:
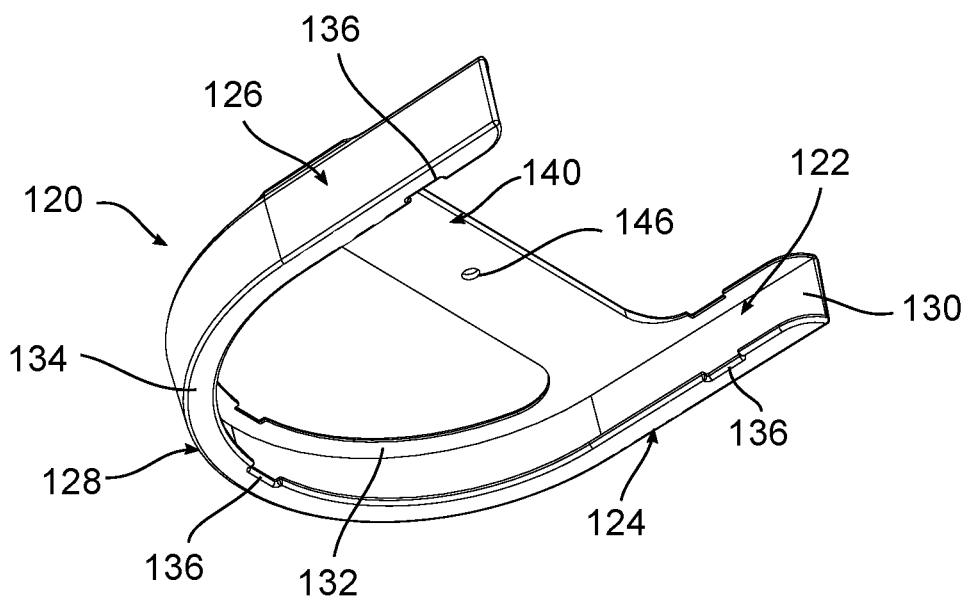
FIG. 10 is a bottom perspective view of the cable support of FIG. 9.
Figure 11:
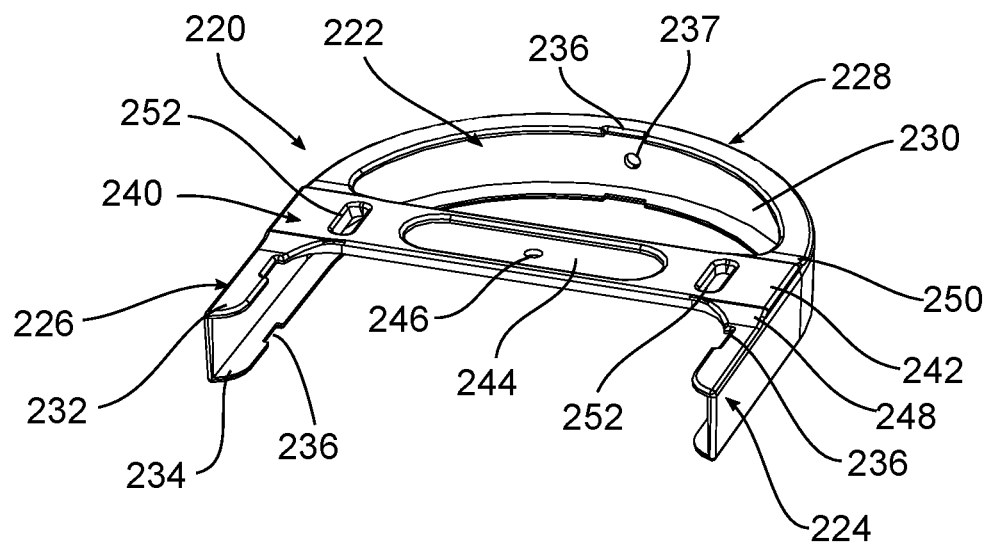
FIG. 11 is a top perspective view of another exemplary cable support.
Figure 12:
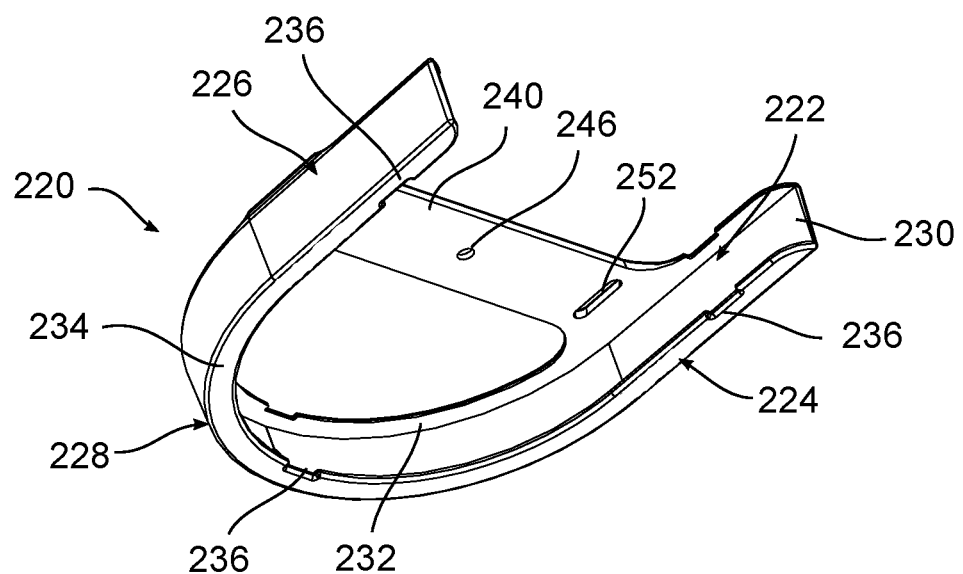
FIG. 12 is a bottom perspective view of the cable support of FIG. 11.
Figure 13:
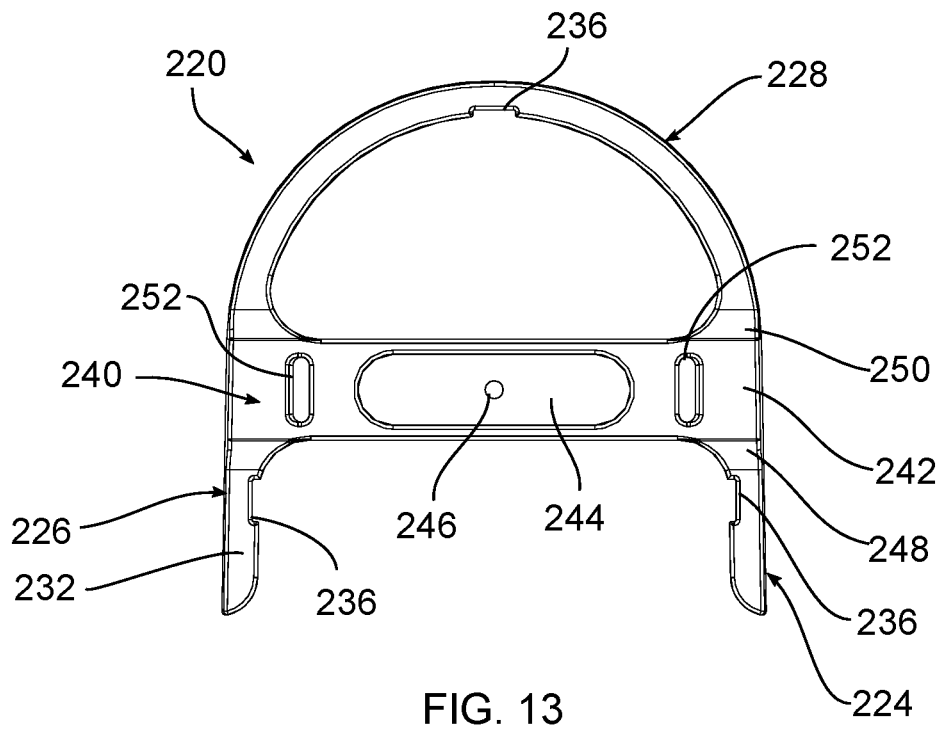
FIG. 13 is a top view of the cable support of FIG. 11.
Figure 14:
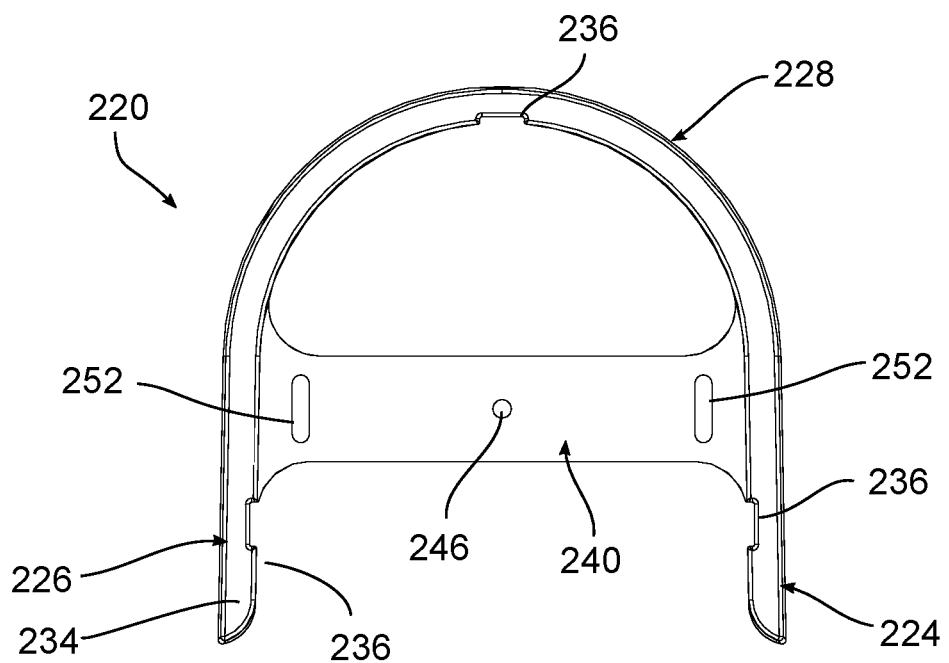
FIG. 14 is a bottom view of the cable support of FIG. 11.

FIGS. 9 and 10 depict an exemplary embodiment of a cable support 120. The cable support 120 includes channel member 122 having a curved portion that retains a section of the cable approximately at or above a minimum bend radius associated with the cable. In the exemplary embodiment, the cable support 120 has a substantially horseshoe-shaped channel member 122 extending from a first open end to a second open end having a first side section 124, a second side section 126, and a curved back section 128. The channel member 122 includes an outer wall 130, a top flange 132, and a bottom flange 134. The top and bottom flanges 132, 134 extend from the outer wall 130 towards the interior of the cable support 120 to create an inward facing channel. The top and bottom flanges 132, 134 can have a curved transition from the front end and the edges of the outer wall 130, top flange 132, and bottom flange 134 can be squared, rounded, or beveled.

According to an exemplary embodiment, the channel member 122 has one or more slots 136 positioned in the top and bottom flanges 132, 134. The exemplary embodiment includes three slots 136 with one positioned in the first side section 124, one positioned in the second side section 126, and one positioned on the back section 128. The slots 136 can be used to retain bands or tie wraps wrapped around the channel member 122 as needed.

According to a further exemplary embodiment, a cross brace 140 extends from the first side section 124 to the second side section 126 across an interior region of the cable support 120. The cross brace 140 includes a top surface 142, a depression 144, and an opening 146, although other shapes and configurations may be used. The depression 144 is spaced below the top surface 142. The opening 146 and the depression 144 are configured to receive mounting components, for example mounting brackets and/or fasteners, to connect the cable support 120 to the cable line 14. In an exemplary embodiment, a counter-sink can be formed around the opening to receive a portion of a fastener, for example a nut or bolt head.

According to an exemplary embodiment, the cross brace 140 extends about the first and second side sections 124,126. A front shoulder 148 and a back shoulder 150 transition from the first and second side sections 124, 126. The front and back shoulders 148, 150 can be curved, angled, squared, or have other configurations or a combination of configurations.

In various alternative embodiments, the size, shape, and configuration of the cable support 120 varies. For example, the cable support 120 may have a closed configuration with a curved front and back. Other alternative embodiments can omit the cross brace 140 or utilize additional cross braces. The position of the cross brace 140 may also be varied from what is shown.

FIGS. 11-14 depict another exemplary embodiment of a cable support 220. The cable support 220 includes channel member 222 having a curved portion that retains a section of the cable approximately at or above a minimum bend radius associated with the cable. In the exemplary embodiment, the cable support 220 has a substantially horseshoe-shaped channel member 222 extending from a first open end to a second open end having a first side section 224, a second side section 226, and a curved back section 228. The channel member 222 includes an outer wall 230, a top flange 232, and a bottom flange 234. The top and bottom flanges 232, 234 extend from the outer wall 230 towards the interior of the cable support 220 to create an inward facing channel. The top and bottom flanges 232, 234 can have a curved transition from the front end and the edges of the outer wall 230, top flange 232, and bottom flange 234 can be squared, rounded, or beveled.

According to an exemplary embodiment, the channel member 222 has one or more slots 236 positioned in the top and bottom flanges 232, 234. The exemplary embodiment includes three slots 236 with one positioned in the first side section 224, one positioned in the second side section 226, and one positioned on the back section 228. The slots 236 can be used to retain bands or tie wraps wrapped around the channel member 222 as needed. An opening 237 is also formed in the back section 228 of the outer wall 230. The opening 237 can receive a mounting fastener or can be used for drainage.

According to a further exemplary embodiment, a cross brace 240 extends from the first side section 224 to the second side section 226 across an interior region of the cable support 220. The cross brace 240 includes a top surface 242, and a depression 244 having an opening 246, although other shapes and configurations may be used. The depression 244 is spaced below the top surface 242. The opening 246 and the depression 244 are configured to receive mounting components, for example mounting brackets and/or fasteners, to connect the cable support 220 to the cable line 14. In an exemplary embodiment, a counter-sink can be formed around the opening to receive a portion of a fastener, for example a nut or bolt head.

The cross brace 240 extends about the first and second side sections 224, 226. A front shoulder 248 and a back shoulder 250 transition from the first and second side sections 224, 226. The front and back shoulders 248, 250 can be curved, angled, squared, or have other configurations or a combination of configurations.

According to an exemplary embodiment the cross brace 240 includes a first and second slot 252 extending through the cross brace. The slots 252 receive a mounting component or fastener, for example a strap or band, to mount the cable guide 220 to a support.

In various alternative embodiments, the size, shape, and configuration of the cable support 220 varies. For example, the cable support 220 may have a closed configuration with a curved front and back. Other alternative embodiments can omit the cross brace 240 or utilize additional cross braces. The position of the cross brace 240 may also be varied from what is shown in the exemplary embodiment of FIGS. 11-14.

Figure 18:
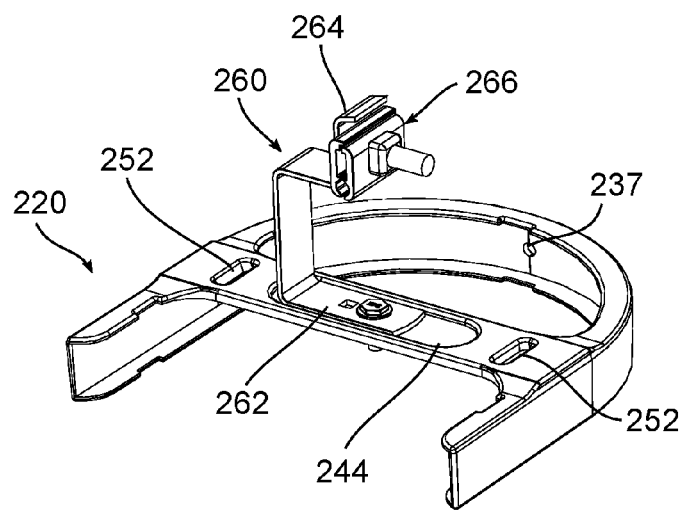
FIG. 18 is a top perspective view of the mounting bracket of FIG. 15 connected to the cable support of FIG. 11.

FIGS. 15-17 show an exemplary embodiment of a mounting bracket 260 used to connect a cable guide to an aerial transmission line 14 and FIG. 18 shows the bracket 260 connected to one of the exemplary cable supports 220. The mounting bracket 260 includes a bottom portion 262 having an opening to receive a fastener. The bottom portion 262 sits in the depression 244 of the cross brace 240. The depression 244 can prevent the bracket from rotating about the fastener. A top portion 264 of the mounting bracket 260 receives a fastener that connects to a clip 266. The clip 266 connects to an aerial line 14, to which a fiber optic cable is lashed or tied.

Figure 19:
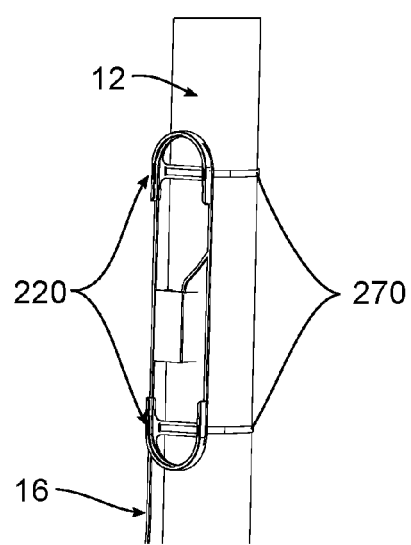
FIG. 19 is a perspective view of two cable supports connected to a pole with a band.
Figure 20:
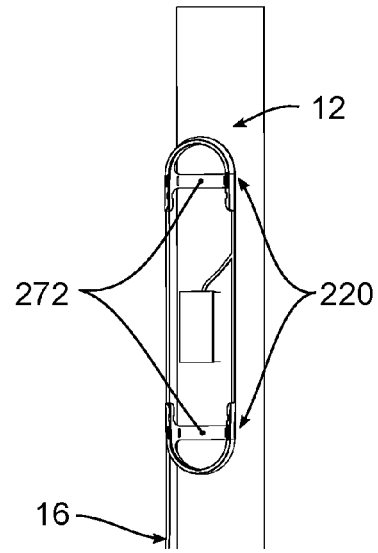
FIG. 20 is a perspective view of two cable supports connected to a pole with a mounting fastener.

FIGS. 19 and 20 show a pair of cable supports 220 connected to a support, for example a pole 12, guiding and supporting a cable loop 16, for example at a termination location which includes a splice enclosure mount to the pole 12. FIG. 19 shows the cable supports 220 connected to the pole 12 using a band 270 that is inserted through the slots 252 in the cross brace 240. FIG. 20 shows the cable supports 220 connected to the pole using fasteners 272 inserted through the opening 246 in the cross brace 240. Although these embodiments show the use of two cable supports 220, other exemplary embodiments can include using only a single cable support 220.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upward," "downward," "outward," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A cable supporting device comprising:
   a channel member having a top flange, a bottom flange, and an outer wall defining an inward facing channel extending around a curved back section, a first side section, and a second side section; and
   a cross brace extending from the first side section to the second side section.

2. The cable supporting device of claim 1, wherein the channel member includes a first open end and a second open end.

3. The cable supporting device of claim 1, wherein the channel member includes a first slot in the top flange and a second slot in the bottom flange aligned with the first slot.

4. The cable supporting device of claim 1, wherein the cross brace comprises a top surface and a depression.

5. The cable supporting device of claim 4, wherein the depression includes an opening.

6. The cable supporting device of claim 1, wherein the back section extends along a bend radius greater than or approximately equal to the minimum bend radius of a fiber optic cable.

7. The cable supporting device of claim 1, wherein a first shoulder and a second shoulder transition from the top flange to the cross brace.

8. The cable supporting device of claim 1, wherein a first slot and a second slot are positioned in the cross brace.

9. The cable supporting device of claim 1, further comprising a cylindrical opening extending through the back section.

10. A cable distribution system comprising:
    a plurality of poles;

a cable extending along the plurality of poles;

a cable supporting device including a channel member having a top flange, a bottom flange, and an outer wall defining a channel extending around a curved back section, a first side section, and a second side section defining an interior, wherein a cross brace extends across the interior and the channel has an opening facing the interior; and a surplus portion of the cable positioned in the channel of the cable supporting device.

11. The cable distribution system of claim 10, wherein the cable supporting device is suspended from the cable by a bracket connected to the cable supporting device.

12. The cable distribution system of claim 11, wherein the cross brace includes a depression receiving the bracket.

13. The cable distribution system of claim 10, wherein the cable supporting device is connected to a pole.

14. The cable distribution system of claim 13, wherein the cable supporting device is connected to the pole by a band extending through a first slot and a second slot in the cross brace.

15. The cable distribution system of claim 13, wherein the cable supporting device is connected to the pole by a fastener.

16. The cable distribution system of claim 15, wherein the fastener extends through an opening in the cross brace.

17. A method of supporting cable comprising:

attaching a cable supporting device to a distribution system, including a channel member having a top flange, a bottom flange, and an outer wall defining a channel extending around a curved back section, a first side section, and a second side section defining an interior of the cable support, and a cross brace extending across the interior, wherein the channel has an opening facing the interior;

forming a loop of a cable; and positioning at least a portion of the loop in the channel.

18. The method of claim 17, wherein attaching the cable supporting device includes connecting a first portion of a bracket to the cable supporting device and connecting a second portion of the bracket to an overhead line.

19. The method of claim 17, wherein attaching the cable supporting device includes connecting the cable supporting device to a pole with a band.

20. The method of claim 17, wherein attaching the cable supporting device includes connecting the cable supporting device to a pole with a fastener.

* * * * *